United States Patent
Kachuk et al.

[11] 3,922,564
[45] Nov. 25, 1975

[54] LIQUID LEVEL CONTROL

[76] Inventors: Paul T. Kachuk, 820 Kensington Blvd., Fort Wayne, Ind. 46805; Ronald E. Karst, R.R. No. 2, Kendalville, Ind. 46755

[22] Filed: Jan. 31, 1974

[21] Appl. No.: 438,251

[52] U.S. Cl.................. 307/118; 73/304 R; 137/392
[51] Int. Cl.² ......................................... G01F 23/00
[58] Field of Search.. 73/290 R, 308, 304 R, 304 C; 307/116, 118; 137/392, 424, 386, 387; 340/244 R, 244 C; 317/DIG. 3

[56] References Cited
UNITED STATES PATENTS

| | | | |
|---|---|---|---|
| 3,408,941 | 11/1968 | Sorensen | 137/392 |
| 3,602,251 | 8/1971 | Hill | 137/392 |

*Primary Examiner*—Herman Hohauser

[57] ABSTRACT

A liquid level control device for controlling the level of a liquid within a reservoir which comprises upper and lower sensors positioned in vertically spaced apart relation in a fluid reservoir and operable between conductive and non-conductive states in response to the level of the fluid in the reservoir. A motor control device operative between "on" and "off" states is coupled to a source of electric operating potential through a bi-directionally conductive switching element, the switching element including a control gate. A first biasing circuit is coupled between the lower sensor and the control gate, and a second biasing circuit is coupled between the upper sensor and the control gate. The second biasing circuit applies a first signal relative to the gate to render the switching element conductive when the upper sensor is conductive, and the first biasing circuit applies a second signal relative to the gate when the second sensor and the switching element are conductive. The switching element is rendered non-conductive when the upper and lower sensors are both non-conductive.

15 Claims, 2 Drawing Figures

LIQUID LEVEL CONTROL

BACKGROUND OF THE INVENTION

1. Field of the Invention

The present invention relates to liquid level control devices and in particular to such a device for controlling the level of a liquid between predetermined upper and lower limits. The device includes a bi-directionally conductive element and unique biasing circuits for rendering the bi-directionally conductive element conductive and non-conductive in response to the level of liquid in the reservoir.

2. Description of the Prior Art

It is well known to provide fluid pumps and associated control circuitry for controlling the level of a liquid within the reservoir or other container. For example, such systems are used to control the level of liquid within water storage tanks and in sumps. In one such type of system, the pump motor and circuitry are hermetically sealed so that they may be physically submerged within the liquid and control of the system is effected by suitable float controlled switches. The circuitry of such systems is simple but the need to hermetically seal the motor and control system and the accessibility of such systems add to their expense and reduce serviceability.

It is also well known to provide such fluid level control devices having sensors mounted within the fluid reservoir with the pump and major portions of the circuitry being remote therefrom. However, such systems present several difficulties. For example, the typical fluid pump operates on an alternating current, typically of 110 or 220 volts AC. Correspondingly, careful attention must be given to grounding and insulation of the system to prevent dangerous electrical shocks.

Further, control systems for the fluid pump typically require the use of direct current circuitry which in turn is utilized to control an alternating current motor control. As a result, prior art control systems have required the use of rectifiers and the like circuitry to provide the necessary operating energy for the system. This circuitry adds to the expense of the system.

In recent years, solid state, that is, transistorized or the like, circuitry has been devised for controlling such fluid systems. These systems have, however, still required the use of rectifiers and the like circuitry, and typically incorporate circuitry such as alternating current bridges to provide the necessary control functions.

SUMMARY OF THE INVENTION

The present invention is a liquid level control device which comprises an upper and a lower sensor positioned in vertically spaced apart relationship in a fluid reservoir. The sensors are individually operable between conductive and non-conductive states in response to the level of the fluid in the reservoir. A motor control device, such as a relay, operative between "on" and "off" states in response to a current therethrough of predetermined magnitude is coupled to a source of operating potential through the load circuit of a bi-directionally conductive switching element, such as a triac, which element includes a pair of electrodes and a control gate. A first biasing circuit is operatively coupled between one switching element electrode and the control gate through the lower sensor, and a second biasing circuit is operatively coupled between one switching element electrode and the control gate through the upper sensor. The second biasing circuit applies a control signal between the gate and one switching element electrode to render the switching element conductive when the upper sensor is conductive. The first biasing circuit applies a latching signal between the gate and one switching element when both the first sensor and the switching element are conductive, and when the second sensor and switching element are conductive while the first sensor is non-conductive. The switching element is rendered non-conductive when both the upper and lower sensors are non-conductive.

In a specific embodiment of the invention, the gate element is grounded and the upper and lower sensors include sensor electrodes positioned in vertically spaced-apart relationship within the fluid reservoir but spaced from the wall of the reservoir.

In yet another specific embodiment of the invention, the first biasing circuit, connected to the lower sensor, produces a voltage phase shift between one electrode of the bi-directionally conductive element and the control element thereof when the bi-directional element has been rendered conductive. This phase shift establishes a latching signal between the control gate and one of the switching element electrodes during each half cycle of the alternating current power used to energize the system to thereby render the bi-directionally conductive element continuously "on". This latching signal does not occur until the bi-directionally conductive device has been rendered conductive, this latter event occurring when the upper sensor and the second biasing circuit have both been rendered operative. The phase shifting biasing network, i.e., the second network, thus operates as an effective latching circuit for maintaining the system in an "on" conduction. The phase shifting network is rendered inoperative when the lower sensor is no longer submerged in fluid thereby turning the system "off".

The present invention, while described in reference to an application as a fluid level control is, as will be apparent to those skilled in the art, applicable to control functions or process variables by the simple substitution of suitable sensors.

It is therefore an object of the invention to provide an improved fluid level control device.

It is another object of the invention to provide such a fluid control device which operates on alternating current without the use of rectifiers or the like components.

Still another object of the invention is to provide such a device which includes novel first and second biasing circuits for rendering this system "on" and latching the system "on" when the fluid within the system has reached a predetermined upper level and automatically turning the system "off" when the level has dropped below a predetermined lower level.

Another object of this invention is to provide such a device which utilizes a triac and a pair of biasing circuits to control operation thereof.

Yet another object of the invention is to provide such a device of substantially reduced complexity and higher reliability.

Still another object of the invention is to provide such a device in which all external portions of the system are grounded.

It is yet another object of the invention to provide such a device wherein the sensitivity thereof can be accurately and simply adjusted.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF A SPECIFIC EMBODIMENT

Figure 1:
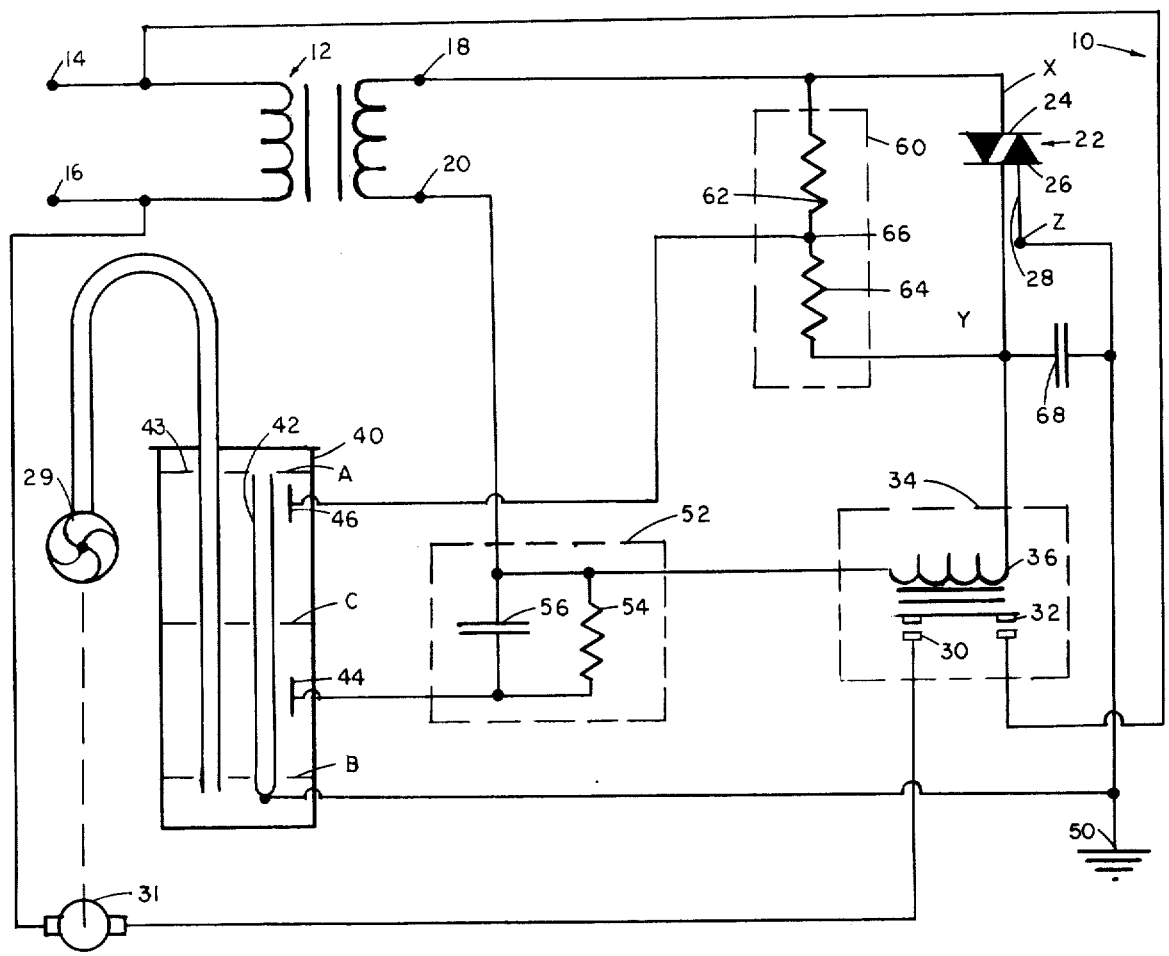
FIG. 1 is an electrical schematic of a liquid level control device in accordance with the present invention.
Figure 1A:
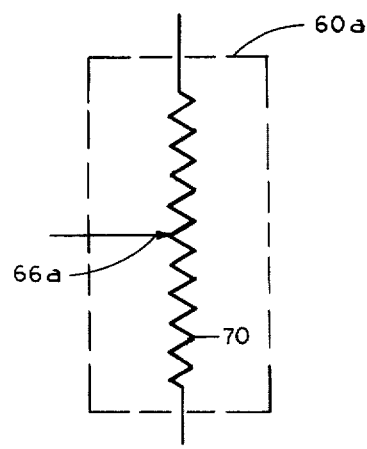
FIG. 1A shows a modification of the circuit of FIG. 1 which enables adjustment of the sensitivity thereof.

Referring now to the drawings there is shown in FIG. 1 an electrical schematic of a liquid control device 10 in accordance with the present invention. The device 10 comprises step-down transformer 12 having input terminals 14, 16 coupled to a source of operating potential of 110 volts alternating current, single phase power. The ratio of the transformer is selected to provide a 24 volt alternating current output at its output terminals 18, 20. A bi-directionally conductive element 22 having a load circuit extending between opposite ones of its electrodes 24, 26 and a control gate 28 is provided, this element being preferably a triac or bi-directional triode thyristor. Broadly, triac 22 will conduct current between its electrodes 24, 26, commonly identified as high or low electrodes, respectively, in either direction in response to the application of a gating signal at its control gate 28, the required gating signal being a current of predetermined magnitude. The signal applied to the control gate 28 may flow in either a positive or negative direction.

A conventional water pump 29 has the motor 31 thereof connected to a source of operating potential through the contacts 30, 32 of a relay 34. The operating coil 36 of relay 34 is connected electrically in series between electrode 26 of triac 22 and terminal 20 of transformer 12. Contacts 30, 32 are normally open in the illustrated embodiment and are closed in response to a current through coil 36 of predetermined magnitude.

A fluid reservoir or water tank is indicated generally at 40. An elongated conductive electrode 42, such as a metal bar, is immersed in tank 40 such that it is in contact with water 43 between the allowable upper and lower fluid levels therein, these levels being denoted by dashed lines A and B, respectively. While electrode 42 is illustrated as being a separate element, it will be apparent to those skilled in the art that it may also be the tank casing itself if the latter is made of metal as is frequently the case.

A lower sensor 44 is positioned within reservoir 40 adjacent the lower fluid level limit "B" and adjacent electrode 42. Similarly, an upper sensor 46 is positioned within reservoir 40 adjacent the upper fluid level limit "A" and adjacent electrode 42. These sensors 44 and 46, in one embodiment are alike and are fixedly secured in position in relation to bar 42. Each sensor 44, 46 is a small conductive plate of metal such as copper, spaced from bar 42, the length of the space and the area of the plate determining the value of resistance and/or reactance between the plates 44, 46 and bar 42. In an operating embodiment, the plates 44, 46 have essentially flat surfaces disposed substantially parallel to the surface of bar 42, are round and have a diameter of about ⅜ inches. The bar 42 has an exposed, adjacent surface, larger of course than the plates 44, 46. Liquid may therefore flow freely between the plates 44, 46 and the bar 42.

Due to the conductivity of the fluid in the reservoir 40, when fluid rises above the lower sensor 44, an electrical path will be completed between electrode 44 and electrode 42 and when the level of liquid in the reservoir 40 rises above upper sensor 42, an electrically conductive path will be completed between electrodes 46 and 42. Electrode 42 is, in turn, connected to control gate 28.

A first biasing circuit, enclosed in dashed box 52, includes a resistor 54 and capacitor 56 connected electrically in parallel between electrode 44 and terminal 20. A second biasing circuit, enclosed in dashed box 60, includes a pair of resistors 62, 64 connected electrically in series between electrode 26 of triac 22 and terminal 18 of transformer 12. Resistors 62, 64 constitute a voltage divider having a tap 66 which is connected to upper sensor 46.

A noise and transient suppressing capacitor 68 is connected between the electrode 26 and control gate 28 of triac 22 to prevent false operation of the triac.

In operation it is first assumed that the water level in reservoir 40 is initially at point "B" below the lower and upper sensors 44, 46, respectively. Under these conditions, no electrical path is completed between electrodes 44, 46 and electrode 42. Relay coil 36 is of a relatively low resistance and inductance such that both of these parameters have a minimal affect on the circuit. The alternating voltage appearing across terminals 18, 20 is thus seen to be applied across a load comprising resistors 62, 64 of biasing circuit 60. It will be observed that under these conditions no gating signal appears at control gate 28 whereby the triac 22 remains non-conductive.

As the fluid rises in reservoir 40 to the point denoted by the letter "C", the fluid covers lower sensor 44 thereby providing a conductive path between sensor 44 and electrode 42. Under these conditions, the first biasing circuit 52 becomes active. However, the current flowing to gate 28 is limited by resistors 62, 64 to a value insufficient to turn "on" triac 22. Correspondingly biasing circuit 52, under these conditions, has relatively little affect on the circuit, and triac 22 remains non-conductive. As the fluid continues to rise in reservoir 40 it eventually reaches a level denoted by the letter "A" and covers electrode 46 thus establishing a conductive path between electrodes 46 and 42. Activation of the upper sensor 46 connects terminal 66 to gate 28 thereby applying a gating signal to gate 28 of sufficient magnitude to turn triac 22 "on".

As soon as triac 22 becomes conductive, the now relatively low impedance of the triac 22 shunts biasing circuit 60, and first biasing circuit 52 becomes the major component in the circuit activity. This biasing circuit 52 in effect produces a relative phase shift in the voltages occurring at electrode 26 and control gate 28 of triac 22. This in turn produces a gating signal at the control gate 28 of triac 22 during each half cycle of the alternating current voltage that is shifted in phase with respect to the voltage appearing across electrodes 24, 26. This gating signal is also of sufficient magnitude, since the now conductive triac 22 shunts resistors 62, 64 to continuously render triac 22 conductive.

Once triac 22 is conductive, a sufficient current flows through the coil 36 of relay 34 to close the contacts 30, 32 thereof and activate the pump motor 31. When the pump 29 and pump motor 31 become active, the fluid level 43 in the reservoir 40 begins to drop. When the fluid level 43 again drops below the upper sensor 46 the conductive path between terminal 66 and control gate 28 is again broken. However, because the triac 22 is conductive, the voltage divider 62, 64 (biasing circuit 60) is still essentially shunted and the gating signal generated by biasing circuit 52 continues to keep triac 22 turned "on". Correspondingly, the triac 22 remains conductive and relay contacts 30, 32 remain closed and the pump 29 continues to operate.

When the fluid level 43 drops below the lower sensor 44, the conductive path between electrode 44 and electrode 42 is broken. Under these conditions, the biasing circuit 52 is rendered inactive. Correspondingly, the gating signal applied to control gate 28 by biasing circuit 52 is removed and triac 22 becomes non-conductive as soon as the voltage applied across its high and low electrode passes through zero. This again reduces the circuit to a series circuit comprising resistors 62, 64 and relay 36. Under these conditions, the current limiting effect of resistors 62, 64, limits the current through relay coil 36 to a value insufficient to maintain the relay 52 closed and the motor 31 is deactivated. From this point, the cycle will repeat.

In a modified embodiment of the invention, biasing circuit 60 (series resistors 62, 64) can be replaced with circuit 60a comprising a potentiometer 70 with the tap 66 being replaced with the slide contact 66a of the potentiometer. In this embodiment, the sensitivity of the circuit can be selectively adjusted by adjusting the potentiometer, this adjustment varying current magnitude of the gating signal derived therefrom.

It will also be observed that control gate 28 can be grounded as at 50 without altering operation of the circuit. Correspondingly, electrode 42 and/or the casing of tank 40 can be grounded thereby substantially reducing the hazard of electrical shock otherwise associated with such systems.

From the above description it is apparent that the fluid level device as disclosed provides substantial improvement over prior art devices. The fluid level control of the present invention does not incorporate any rectifiers or the like components. Rather, the device of the present invention operates entirely upon alternating current and functions through the operation of unique voltage divider and phase-shifting circuits.

The device is substantially simpler than prior art controls of this type and provides for complete grounding of all external exposed parts of the system thereby substantially reducing the possibility of electrical shock. In a modified form of the invention, the sensitivity of the device can be simply and accurately controlled. The entire device functions without the use of moving parts with the exception of the conventional motor control device or relay.

Modifications and alternative uses of the invention will also be apparent to those skilled in the art. For example, the upper and lower sensors can be normally conductive and reversed in position to provide a system which will fill rather than empty a reservoir. Other forms of sensors can be employed to sense different process variables such as pressure, temperature and the like, it only being necessary to have sensors operable between conductive and non-conductive states at predetermined process variable limits. The motor control device can similarly be replaced with various alternating current control devices, both electro-mechanical and solid state.

Also this invention may be used in conjunction with liquids that are non-conductive (such as insulating oil). In this alternative the sensors would resemble capacitors, the electrodes 44, 46 constituting one plate of each capacitor and the conductive bar 42 the other plate. The change in dielectricity between the respective plates due to the presence and absence of the oil alters the capacitance for operating the triac 22 as explained. The sensors are thus reactive rather than resistive, otherwise the circuitry operates the same as previously explained.

In a working embodiment of the invention, the following circuit, components were used:

```
       triac - A03001
  Resistor 62 - 6.8K ohms, ½ watt
           64 - 1K ohm, ½ watt
      54 - .47 meg ohms, ½ watt
  Capacitor 56 - .18 microfarad
           68 - .01 microfarad
Transformer 12 - 110 volts AC to 24 volts AC
     Relay 34 - 24 volt AC coil, normally open
                contacts
```

While there have been described above the principles of this invention in connection with specific apparatus, it is to be clearly understood that this description is made only by way of example and not as a limitation to the scope of the invention.

What is claimed is:

1. A liquid level control device comprising
   a. upper and lower sensors positioned in vertically spaced relation in a fluid reservoir and individually operable between conductive and non-conductive states in response to the level of fluid in said reservoir,
   b. a motor control device operative between "on" and "off" states in response to a current of predetermined magnitude,
   c. a source of electric operating potential,
   d. a switching element having electrode means for coupling the switching element electrically between said motor control device and said source and further having a control electrode, said switching element being operable between conductive and non-conductive states in response to the presence and absence, respectively, of a control signal between said electrode means and said control electrode,
   e. first biasing circuit means consisting of passive circuit elements coupled to said electrode means and coupled to said control electrode through said lower sensor for applying a first control signal between said electrode means and said control electrode when said lower sensor changes between conductive and non-conductive states,
   f. second biasing circuit means consisting of passive circuit elements coupled to said electrode means and coupled to said control electrode through the upper sensor for applying a second control signal between said control electrode and electrode means when said upper sensor changes between conductive and non-conductive states to turn said switching element "on", said switching element remaining "on" until said lower sensor changes back to its original state.

2. The device of claim 1 wherein said switching element is a triac, said source being an alternating current source, said first control signal being an alternating current signal shifted in phase with respect to said source current.

3. The device of claim 2 wherein said control gate is connected to ground.

4. The device of claim 1 wherein said first biasing circuit includes a resistor and a capacitor connected electrically in parallel between switching element and said lower sensor.

5. The device of claim 4 wherein said biasing circuit includes a voltage divider having a tap between its ends, said voltage divider being connected electrically in parallel with said switching element, said tap being connected to said upper sensor.

6. The device of claim 4 wherein said second biasing circuit includes a potentiometer connected electrically in parallel with said switching element, said potentiometer including a wiper connected to said upper sensor.

7. The device of claim 1 wherein said upper and lower sensors includes upper and lower electrodes and a common electrode, said upper and lower electrodes being disposed in spaced-apart relationship to said common electrode, said common electrode being connected to ground.

8. The device of claim 3 further including a noise suppressing capacitor connected between one element of said triac and said control gate.

9. The device of claim 7 wherein said motor control device is an alternating current relay having a relay coil connected electrically in series with the load circuit of said triac.

10. The device of claim 2 wherein said source of operating potential includes a step-down transformer having a pair of output terminals, said triac including first and second electrodes, one of said triac electrodes being connected to one of said transformer output terminals, said motor control device including an alternating current relay having an operating coil connected electrically in series between the other of said triac electrodes and the other of said transformer output terminals, said first biasing circuit including a resistor and capacitor connected electrically in parallel between said other of said transformer terminals and said lower sensor, said second biasing circuit including a voltage divider connected electrically in parallel with said triac and having a voltage tap connected to said upper sensor, said upper and lower sensors including upper and lower sensor electrodes, respectively, and a common electrode disposed in spaced-apart relationship thereto, said common electrode being connected to said control gate, said control gate being connected to ground, and a noise suppressing capacitor connected between said other triac electrode and said control gate.

11. A device for controlling a process variable comprising first and second sensor means for sensing said process variable and being individually operable between conductive and non-conductive states in response to said process variable being at predetermined first and second control limits, respectively, means for altering said process variable from one to the other of said control limits, current responsive means for controlling operation of said altering means between "on" and "off" conditions, a solid-state alternating current switch having a control gate and being operable between conductive and non-conductive states in response to the presence and absence of a control signal between said switch and control gate, respectively, for selectively applying current to said current responsive means, first biasing circuit means coupled to said switch and to said control gate through said first sensor for applying a first control signal between said control gate and said switch when said first sensor is conductive, and second biasing circuit means coupled to said switch and to said control gate through said sensor for generating and applying a second control signal between said gate and said switch when said second sensor is conductive and said solid-state current switch is conductive, said switch including high and low electrodes, said first biasing circuit means generating a first gating signal of sufficient magnitude to render said switch conductive, said second biasing circuit means generating a second gating signal, said second gating signal being an alternating current signal shifted in phase with respect to the alternating current flowing through said high and low electrodes.

12. The device of claim 11 wherein said control gate is grounded, said first biasing circuit means being a resistive circuit, said second biasing circuit means including a reactive element.

13. A liquid level control device comprising
a. upper and lower sensors positioned in vertically spaced relation in a fluid reservoir and individually operable between conductive and non-conductive states in response to the level of fluid in said reservoir,
b. a motor control device operative between "on" and "off" states in response to a current of predetermined magnitude,
c. a source of alternating current operating potential having two terminals,
d. a bi-directional conductive switching element having two coupling electrodes, one of said coupling electrodes being connected to one terminal of said source of alternating current and the other of said coupling electrodes being connected to said motor control device, said motor control device being connected to the other terminal of said source of alternating current operating potential,
e. said bi-directional conductive switching element having a control electrode, said switching element being operable between conductive and non-conductive states in response to the presence and absence, respectively, of a control signal between said control electrode and said coupling electrodes,
f. first biasing circuit means connected to said control electrode through one of said sensors for applying a first alternating current control signal between said coupling electrodes and said control electrode, when said one sensor changes between a conductive and non-conductive state to cause said switching element to become conductive,
g. second biasing circuit means connected to said control electrode through the other of said sensors for applying a second alternating current control signal between one of said coupling electrodes and said control electrode when said other sensor changes between a conductive and non-conductive state when said switching element is rendered conductive by said first biasing circuit, said switching element remaining conductive until said second sensor changes back to its original state.

14. A liquid level control device for controlling the liquid level in a liquid container comprising first and second sensor means for sensing the level of the liquid in the container and being individually operable between conductive and non-conductive states in response to liquid levels corresponding to said first and second means position in the container, respectively, means for altering said liquid level from one to the other of said liquid levels, current responsive means for controlling operation of said altering means between "on" and "off" conditions, a solid-state alternating current switch having a control gate and being operable between conductive and non-conductive states in response to the presence and absence of a control signal between said switch and said control gate, respectively, for selectively applying current to said current responsive means, first biasing circuit means coupled to said switch and to said control gate through said first sensor for applying a first control signal between said switch and said control gate when said first sensor is conductive, and second biasing circuit means coupled to said switch and to said control gate through said second sensor for generating and applying a second control signal between said gate and said switch when said second sensor is conductive and said solid-state current switch is conductive, said switch including high and low electrodes, said first biasing circuit means generating a first gating signal of sufficient magnitude to render said switch conductive, said second biasing circuit means generating a second gating signal, said second gating signal being an alternating current signal shifted in phase with respect to the alternating current flowing through said high and low electrodes.

15. The device of claim 14 wherein said control gate is grounded, said first biasing circuit means being a resistive circuit, said second biasing circuit means including a reactive element.

* * * * *

UNITED STATES PATENT OFFICE
CERTIFICATE OF CORRECTION

Patent No. 3,922,564            Dated November 25, 1975

Inventor(s) Paul T. Kachuk, Ronald E. Karst

It is certified that error appears in the above-identified patent and that said Letters Patent are hereby corrected as shown below:

IN THE SPECIFICATION

Column 2, line 34, --biasing-- should be inserted after "second"
Column 3, line 18, --level-- should be inserted after "liquid"

IN THE CLAIMS

Claim 4, Column 7, line 11, --said-- should be inserted after "between"
Claim 5, Column 7, line 13, --second-- should be inserted before "biasing"
Claim 11, Column 8, line 11, --second-- should be inserted before "sensor"

Signed and Sealed this twentieth Day of April 1976

[SEAL]

Attest:

RUTH C. MASON
Attesting Officer

C. MARSHALL DANN
Commissioner of Patents and Trademarks